Dec. 4, 1945.                G. E. DATH                2,390,205
                            SHOCK ABSORBER
                         Filed Oct. 11, 1943
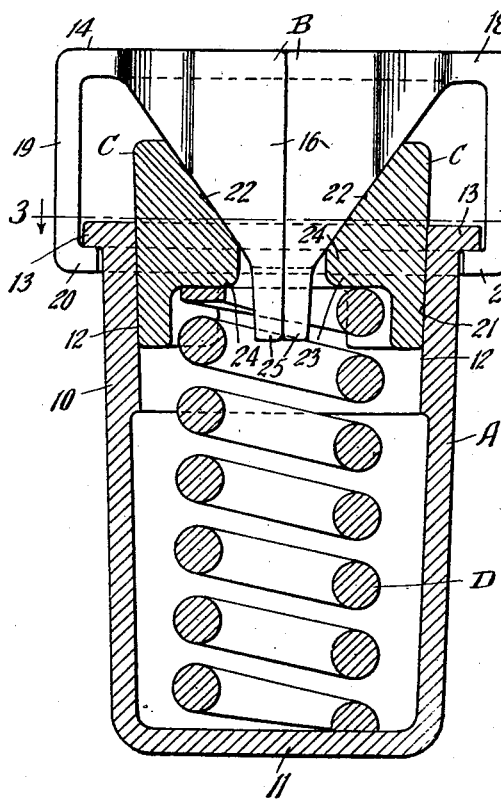
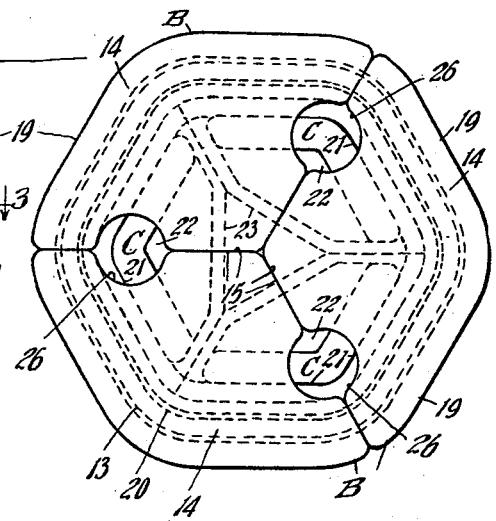
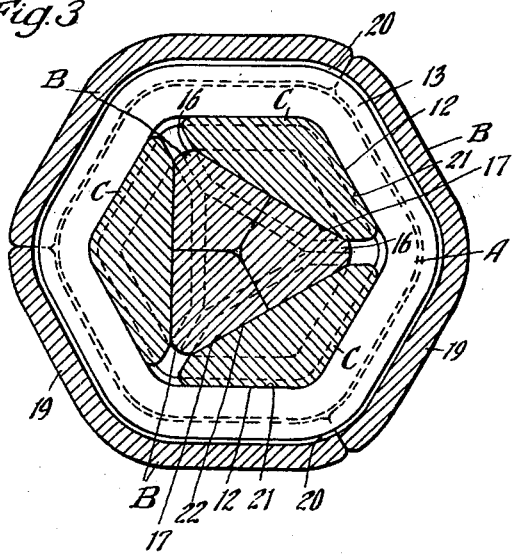
Inventor
George E. Dath
By Henry Fuchs
      Atty.

Patented Dec. 4, 1945

2,390,205

UNITED STATES PATENT OFFICE 2,390,205

SHOCK ABSORBER

George E. Dath, Chicago, Ill., assignor to W. H. Miner, Inc., Chicago, Ill., a corporation of Delaware Application October 11, 1943, Serial No. 505,795

7 Claims. (Cl. 267—9)

This invention relates to improvements in shock absorbers, especially adapted for use in connection with truck springs of railway cars for dampening the action of the truck springs.

One object of the invention is to provide a shock absorber of the character indicated which is of simple design and may be readily assembled.

A more specific object of the invention is to provide a shock absorber comprising a friction casing, and a spring resisted friction clutch slidable within the casing wherein the clutch comprises a sectional wedge block and friction shoes having wedging engagement with the block to hold the sections thereof assembled, and wherein the wedge has anchoring flanges on the sections thereof in shouldered engagement with flanges provided on the casing to limit outward movement of the wedge and hold the parts of the mechanism assembled.

Other objects of the invention will more clearly appear from the description and claims hereinafter following.

In the drawing forming a part of this specification, Figure 1 is a vertical sectional view on two intersecting planes at 60 degrees with respect to each other. Figure 2 is a top plan view of Figure 1. Figure 3 is a horizontal sectional view, corresponding substantially to the line 3—3 of Figure 1.

As shown in said drawing, my improved shock absorber comprises broadly a casing A; a three piece wedge block B; three friction shoes C—C—C; and a spring resistance D.

The casing A is of substantially hexagonal interior and exterior cross section having a friction shell section 10 at the top end thereof. The casing A is closed at the bottom end by a transverse wall 11. The friction shell section 10 of the casing A is provided with six interior, substantially flat friction surfaces 12—12 which converge inwardly of the casing and are spaced symmetrically about the central longitudinal axis of the mechanism. The interior of the friction shell thus presents six interior friction surfaces, adjacent surfaces of which are angularly disposed with reference to each other, thereby providing three pairs of surfaces, the adjacent members of each pair forming a friction face of V-shaped, transverse cross section.

At the open upper end, the casing A is provided with a continuous outturned retaining flange 13 for a purpose hereinafter described.

The wedge B comprises three similar sections 14—14—14, the wedge being divided into three equal parts. In end elevation the three part wedge is of hexagonal outline, as shown in Figure 2, each section 14 including two of the sides of the hexagon which form the outer sides of the section, and two faces or sides 15—15, which are radial to the central longitudinal axis of the mechanism and disposed at an angle of 120 degrees to each other. Each section comprises a solid inner portion 16 presenting the sides 15—15. The portion 16 has a pair of wedge faces 17—17 which converge laterally outwardly. The faces 17—17 of the portion 16 of each section 14 are inclined inwardly and toward the central axis of the mechanism. When assembled, the three sections 14—14—14 of the wedge B form a single wedge projection of substantially triangular cross section, as shown in Figure 3, the two adjacent faces 17—17 of adjacent sections 14—14 defining one side of the triangle. In other words, the wedge projection formed by the three assembled sections 14—14—14 has three flat wedge faces which converge inwardly of the mechanism, each face being formed half on one and half on the other of two adjacent sections 14—14. Each section 14 has a laterally, outwardly extending top web 18 which has the outer surface thereof aligned with and forming a continuation of the outer end face of the section 14. Extending downwardly from the outer edge of the web 18 are connected vertical walls 19—19 which are angularly disposed with respect to each other and form two sides of the hexagon shaped wedge B. The walls 19—19 have inturned horizontal flanges 20—20 at their lower ends which engage in back of the flange 13 of the casing to limit outward movement of the wedge B and anchor the same to the casing A.

The friction shoes, which are three in number, are arranged about the central wedge projection of the wedge B formed by the three portions 16—16—16 of the wedge sections 14—14—14, the shoes being interposed between the central wedge projection and the interior friction surfaces 12—12 of the casing. The shoes and wedge together form a friction clutch which has sliding frictional engagement with the casing A. The three shoes C—C—C are of like design, each shoe having a V-shaped friction surface 21 on the outer side which cooperates with the corresponding V-shaped friction face of the casing formed by two adjacent surfaces 12—12 of said casing. At the inner side, that is, the side nearest the central axis of the mechanism, each shoe has a flat wedge face 22 formed on a lateral enlargement 23. As shown in Figure 3, the flat wedge face 22 cooperates with the flat wedge face of the wedge B formed by two flat wedge faces 17—17 of adjacent sections 14—14 of said wedge B. In other words, the wedge face of each shoe overlaps two sections 14—14 of the wedge B. The inner end of the enlargement 23 of each shoe presents a flat transverse abutment face 24 for the spring D.

The spring D comprises a single coil disposed within the casing A and having its opposite ends bearing respectively on the inner side of the end wall 11 of the casing and the transverse abutment faces 24—24—24 of the shoes C—C—C. As shown in Figure 1, the wedge B has a rearward central extension 25 formed respectively on the three sections 14—14—14 of the wedge, which projects into the end of the coil spring D.

In assembling the mechanism, the spring D and the shoes C—C—C are first placed within the casing by inserting the same through the open front end of said casing. With the casing standing on end, the shoes are forced inwardly to a predetermined extent and held in that position while assembling the three piece wedge B with the casing. The predetermined position referred to is such that the wedge faces of the shoes will be disposed inwardly clear of the wedge faces of the wedge block B when the sections 14—14—14 of the latter are separated to a degree to have the flanges 20 clear the flange 13 of the casing and be engaged in back of said flange 13. While the shoes are so held by a suitable holding means in the form of a tool or tools engaged with the shoes, the three sections of the wedge B are applied, the sections 14—14—14 being provided with openings 26 to accommodate the holding means. The sections 14—14—14 are applied by first engaging the flanges 20 thereof in back of the flange 13 of the casing. The sections are then moved together, that is the wedge B is contracted, as shown in Figure 1. The pressure is then removed from the shoes C—C—C, permitting the spring D to project the same outwardly into wedging engagement with the sections 14—14—14 of the wedge B, thereby forcibly holding the wedge B contracted with the flanges 20 thereof in anchoring relation to the flange 13 of the casing.

My improved shock absorber or snubber replaces one or more of the spring units of a cluster of truck springs of a railway car and is compressed as the spring follower plates of the truck are moved toward each other, thereby dampening the action of the truck springs. As the shock absorber is compressed, the wedge B is carried inwardly of the casing A, spreading the shoes C—C—C apart and bringing the same into tight frictional contact with the friction surfaces of the casing. At the same time the shoes are moved inwardly along the friction surfaces of the casing against the resistance of the spring D, thereby creating the desired frictional resistance to produce the dampening effect. Compression of the shock absorber is limited by engagement of the webs 18 with the outer end of the casing. When the actuating pressure is reduced, the spring D returns all of the parts to the normal full release position shown in Figure 1, outward movement of the wedge B being limited by engagement of the flanges 20 thereof with the flange 13 of the casing.

I have herein shown and described what I now consider the preferred manner of carrying out my invention, but the same is merely illustrative and I contemplate all changes and modifications that come within the scope of the claims appended hereto.

I claim:

1. In a shock absorber, the combination with a friction casing open at one end and closed at the other end, said open end being provided with interior friction surfaces; of a laterally, outwardly projecting, retaining flange at the open end of said casing; a plurality of friction shoes having sliding engagement with the friction surfaces of the casing; a central length-wise divided sectional wedge between said shoes having wedging engagement therewith to spread the same apart; and a flange on each section of said wedge overhanding the flange of the casing and engageable in back of said flange of the casing to limit outward movement of the wedge.

2. In a shock absorber, the combination with a friction casing open at one end and having interior, inwardly converging, friction surfaces at said open end; of a laterally, outwardly projecting, retaining flange at the open end of the casing; a sectional wedge member having a central wedge projection provided with inwardly converging, flat, wedge faces; an inturned flange on each section of said wedge overhanging the flange of the casing and engageable in back of said casing flange to limit outward movement of the wedge; friction shoes surrounding said wedge projection and having flat wedge faces engaged by the wedge faces of the wedge projection, said shoes having friction surfaces on the outer sides thereof in sliding engagement with the friction surfaces of the casing; and a spring within the casing opposing inward movement of the shoes.

3. In a shock absorber, the combination with a friction casing open at one end and having interior, inwardly converging, friction surfaces at said open end; of a laterally, outwardly projecting, retaining flange at the open end of the casing; a sectional wedge member divided on planes radial to the central longitudinal axis of the mechanism, said sectional wedge having portions thereof overhanging the casing, said overhanging portions having inturned flanges engaged in back of the flange of the casing; a central inward projection on said wedge having inwardly converging, flat, wedge faces; friction shoes surrounding said wedge projection and having flat wedge faces engaged by the wedge faces of the wedge projection, said shoes having friction surfaces on the outer sides thereof in sliding engagement with the friction surfaces of the casing; and a spring within the casing opposing inward movement of the shoes.

4. In a shock absorber, the combination with a friction casing open at one end and having interior, inwardly converging, friction surfaces at said open end; of a laterally, outwardly projecting, retaining flange on said casing at the open end thereof; a three piece sectional wedge divided radially of the central longitudinal axis of the mechanism, said wedge sections having portions telescoped over the open end of said casing, said telescoped portions having shoulders engageable in back of the flange of the casing to limit outward movement of the wedge; a central inward projection on said wedge having inwardly converging, flat, wedge faces; a plurality of friction shoes surrounding said wedge projection, said shoes having flat wedge faces engaged by the wedge faces of the wedge projection and outer friction surfaces slidingly engaged with the friction surfaces of the casing; and a spring within the casing opposing inward movement of the shoes.

5. In a shock absorber, the combination with a friction casing open at one end and having interior, inwardly converging, friction surfaces at said open end; of a laterally, outwardly projecting, retaining flange on said casing at the open end thereof; a radially divided sectional wedge having an inwardly extending central projection formed partly on each section thereof, each section of said wedge having a portion thereof telescoped over the open end of the casing, said telescoped portion having inturned flanges engaged in back of the flange of the casing to limit outward movement of the wedge section, said central projection having inwardly converging, flat, wedge faces, each face being formed partly on two adjacent sections of said wedge; a plurality of friction shoes surrounding said wedge projection, each shoe having a flat wedge face on the inner side thereof engaged by one of the flat wedge faces of the wedge projection, said wedge face of the shoe overlapping both portions of the wedge face of two adjacent sections of the wedge, each shoe having a friction surface slidably engaged with one of the friction surfaces of the casing; and a spring within the casing yieldingly opposing inward movement of the shoes.

6. In a shock absorber, the combination with a friction casing open at one end and having interior, inwardly converging, friction surfaces at said open end; of a laterally, outwardly projecting, retaining flange on said casing at the open end thereof; a radially divided sectional wedge having an inwardly extending central projection formed partly on each section thereof, each section of said wedge having a portion thereof telescoped over the open end of the casing, said telescoped portion having inturned flanges engaged in back of the flange of the casing to limit outward movement of the wedge section, said central projection having inwardly converging, flat, wedge faces; a plurality of friction shoes surrounding said wedge projection, each shoe having a flat wedge face on the inner side thereof engaged by one of the flat wedge faces of the wedge projection, each shoe having a friction surface slidably engaged with one of the friction surfaces of the casing; and a spring within the casing yieldingly opposing inward movement of the shoes.

7. In a shock absorber, the combination with a friction casing of hexagonal, interior cross section, open at one end and having inwardly converging, interior friction surfaces at said open end, said surfaces being of V-shaped, transverse, cross section; of a laterally, outwardly projecting, retaining flange on said casing at the open end thereof; a radially divided sectional wedge having an inwardly extending, central projection formed partly on each section thereof, each section of the wedge having a wall portion telescoped over the open end of the casing, said wall having an inturned flange at the inner end thereof engaged in back of the flange of the casing to limit outward movement of the wedge section, said central projection having three inwardly converging flat wedge faces; three friction shoes surrounding said wedge projection, each shoe having a flat wedge face on the inner side thereof engaged by one of the flat wedge faces of the wedge projection, each shoe having a friction surface of V-shaped transverse cross section engaged with one of the V-shaped friction surfaces of the casing; and a spring within the casing yieldingly opposing inward movement of the shoes.

GEORGE E. DATH.